United States Patent

Howell

[15] 3,700,870

[45] Oct. 24, 1972

[54] ERROR CONTROL ARRANGEMENT FOR ASSOCIATIVE INFORMATION STORAGE AND RETRIEVAL

[72] Inventor: Thomas H. Howell, Scottsdale, Ariz.

[73] Assignee: Honeywell Information Systems Inc., Waltham, Mass.

[22] Filed: April 9, 1971

[21] Appl. No.: 132,860

[52] U.S. Cl. ..........................235/153, 340/173 AM

[51] Int. Cl...........................G11c 29/00, G11c 15/00

[58] Field of Search....235/153; 340/146.1, 173 AM, 340/172.5

[56] References Cited

UNITED STATES PATENTS

| | | | |
|---|---|---|---|
| 3,444,522 | 5/1969 | Polhemus | ...............340/146.1 |
| 3,548,385 | 12/1970 | Tunis | .....................340/172.5 |

OTHER PUBLICATIONS

A. B. Lindquist, Associative Memory With Nearest Match, IBM Technical Disclosure Bulletin, Vol. 8, No. 3, August 1965, pp. 372–375.

*Primary Examiner*—Charles E. Atkinson
*Attorney*—Fred Jacob and Edward W. Hughes

[57] ABSTRACT

Data key words, encoded in a certain error correcting code, are read from a storage device and compared with a similarly encoded master key word. If, for any pair of words compared, the pattern of digit positions having differing digits does not correspond to an error pattern which is correctable by the error correcting code, then a mismatch between the pair is assumed. If, on the other hand, the pattern of digit positions having differing digits does correspond to a correctable error pattern, then a match is assumed. The stored data associated with the matching or mismatching data key word may then be utilized in accordance with the outcome of the comparison.

9 Claims, 2 Drawing Figures

INVENTOR
T. H. HOWELL

BY Calvin E Thorpe

ATTORNEY

INVENTOR
T.H. HOWELL
BY Calvin E. Thorpe
ATTORNEY

ERROR CONTROL ARRANGEMENT FOR ASSOCIATIVE INFORMATION STORAGE AND RETRIEVAL

BACKGROUND OF THE INVENTION

The invention relates to associative information storage and retrieval and more particularly to an error control method and apparatus for use in associative information storage and retrieval.

Methods of storing information in or retrieving information from storage may be divided into two broad classifications according to the manner of determining the desired location in storage into which or from which information is to be stored or retrieved. In one method, storage or retrieval of information is carried out be selecting a particular address or location in the storage unit and then storing information in or retrieving information from that location independent of the information being stored or retrieved. In the other method, referred to as associative storage and retrieval, the desired location in storage is selected by comparing or "associating" certain of the stored information, known as data keys, with retrieval or master keys. The occurrence of a match between a data key and a master key identifies that information is storage which is associated with the matching data key either as the information desired for retrieval or as information to be replaced by storing information thereover. In associative storage and retrieval, of course, the desired information is located in accordance with the content of the information and not its location in storage.

In both methods of information storage and retrieval, it is desirable to provide some type of error control for the stored information. It is especially desirable in associative storage and retrieval since the accuracy of the stored information is important not only in the end use of any retrieved information but also in determining the location of the desired information. That is, an error in the stored information could result in the wrong information being located or in failure to locate the proper information.

One method of providing error control in associative information storage and retrieval is to encode the data keys in accordance with some error correcting code prior to storage thereof in the storage device. Then, when it is desired to locate information, the encoded data keys are read from the storage device, corrected in accordance with the error correcting code, and compared with a master key to locate the desired information. With this method, the data keys read from the storage device must be buffered or temporarily stored while the correction of the keys is being carried out. Furthermore, a certain amount of delay results in the overall storage or retrieval process since the error correcting process must be completed before the data keys can be compared with the master key.

SUMMARY OF THE INVENTION

It is an object of the present invention to provide an efficient and economical error control arrangement for associative information storage and retrieval.

It is another object of the present invention to provide such an error control arrangement which does not require buffering of data keys retrieved from the storage device.

It is still another object of the present invention to provide such an error control arrangement wherein no error correction of retrieved data keys is required in the process of locating desired information.

Finally, it is an object of the present invention to avoid delay in the associative storage and retrieval of information while also providing error control for the retrieved information.

These and other objects and features of the present invention are realized in a specific illustrative embodiment in which data key words, having been encoded in a certain error correcting code, are read from a storage device and compared with similarly encoded master key words. If, for each pair of words compared, the pattern of digit positions having differing digits corresponds to an error pattern which is correctable by the error correcting code, then a match between the pair of words is assumed. If, on the other hand, the pattern of digit positions having differing digits does not correspond to a correctable error pattern, then a mismatch between the pair of words is assumed. Depending on the outcome of each comparison of a data key word with a master key word, appropriate action may be taken with respect to the corresponding data stored in the storage device. In this manner, the effect of errors on the data locating process can be abrogated within the limitations of the error correcting code utilized.

BRIEF DESCRIPTION OF THE DRAWINGS

A complete understanding of the present invention and of the above and other objects and advantages thereof may be gained from a consideration of the following detailed description presented in connection with the accompanying drawings which are described as follows.

DETAILED DESCRIPTION

Figure 1:
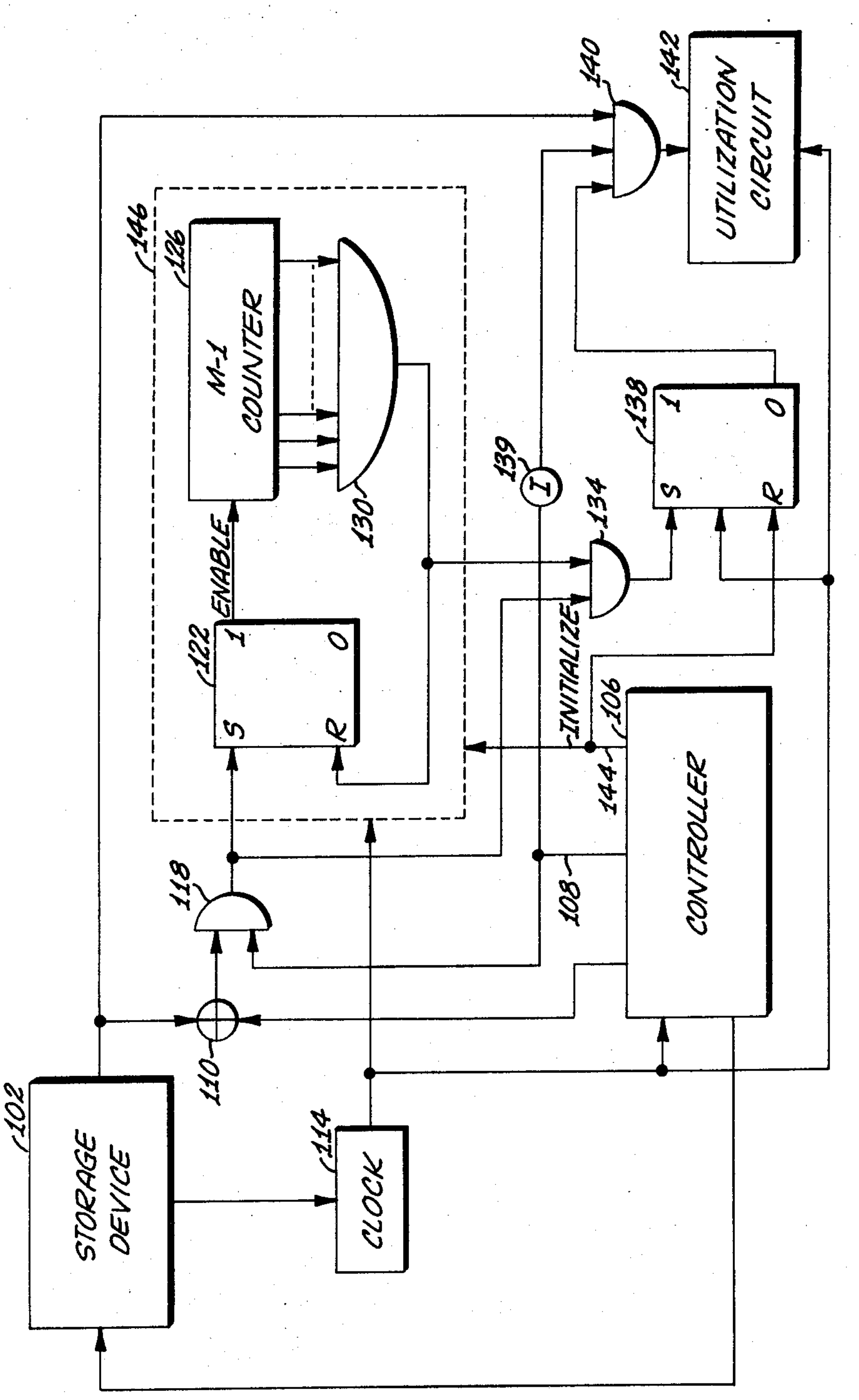
FIG. 1 shows circuitry for providing burst error control for associative information retrieval in accordance with the present invention.

Before describing the apparatus of FIGS. 1 and 2, a brief discussion of error correcting codes will be given.

Digital data is most often represented or coded in sequences of binary signals (hereafter referred to as bits). Each position in any sequence or code word consists of a bit "0" or "1," the different code word permutation of bits representing different items of information. Errors occur in code words when a bit or bits are changed from a value "0" to a value "1," or vice versa. (So-called erasure errors where it is not possible to determine the value of erroneous bits are not of concern here.) The underlying object in utilizing error correcting codes is to be able to decode an erroneous word and obtain the original and correct version of the word.

To understand how this object is achieved, at least for random error correcting codes (to be described later) it is necessary to understand the concept of "-Hamming distance" between code words. The Hamming distance between any two code words is simply the number of digit or bit positions in which the code words differ. For example, the Hamming distance between the words 000111 and 111111 is three, since the first three bit positions of the first word differ from the corresponding first three bit positions of the second word.

In order to protect against random errors in data, it is necessary to encode the data into code words having a sufficient Hamming distance between every pair of code words so that when errors occur, the erroneous or altered word is still "closer" in Hamming distance to the original unaltered code word than to any other code word of the code. As an example, a code in which each code word is at least a Hamming distance of five from every other code word has the capability of correcting up to two errors per code word. This is because the occurrence of up to two errors in a code word would result in that word being at most a Hamming distance of only two from the original unaltered code word, whereas it would still be a Hamming distance of at least three from every other code word of the code. Thus, in the decoding process, the altered word would be corrected to its original unaltered counterpart since that is the code word to which it is closest in Hamming distance.

Error correcting codes may be generally divided into two classes — random error correcting codes and burst error correcting codes. A random error correcting code is one which is constructed to deal primarily with errors which occur randomly (i.e. independently of other errors) throughout the data in question. Burst error correcting codes, on the other hand, are those constructed to deal primarily with errors which occur in bunches or bursts throughout the data. For a general discussion of random and burst error correcting codes, see Peterson, W.W., Error-Correcting Codes, the MIT Press, 1961. An example of a suitable burst error correction encoder is shown in FIG. 10.2, at page 193 of the aforesaid Peterson reference.

In some burst error correcting codes, such as the Fire codes as described in the aforecited Peterson text, pages 189–195, the concern is not with the Hamming distance between code words, but rather with the length of the span of bits (in a code word) which includes all bits which differ from the corresponding bits of other code words. That is, the concern is with the length of a span which begins with the first differing bit and ends with the last differing bit and which may include within the span nondiffering as well as differing bits. This span will hereinafter be referred to as the differing bit span.

Error correction utilizing the above-mentioned burst error correcting codes may be accomplished by comparing each word to be decoded with valid code words. If, for each comparison, the differing bit span is greater than a certain number corresponding to the burst error correcting capability of the code, then the word being decoded is assumed not to be the code word with which it is being compared. On the other hand, if the differing bit span is less than the burst error correcting capability of the code, then the word being decoded is assumed to be that code word with which it is being compared.

The illustrative apparatus of FIG. 1 utilizes a burst error correcting code of the type described above and having a capability of correcting error bursts of up to $m$ bits in length. The apparatus includes a storage device 102 for storing a plurality of groups of data. This storage device might illustratively be a magnetic disc or drum storage unit. Associated with each group of data in the storage device is a data key word for identifying the particular data group. Each data key word and corresponding group of data are placed in the storage device 102 so that upon retrieval thereof, the data key word is always retrieved just prior to retrieval of the corresponding group of data.

Selecting a desired group of data for retrieval from the storage device 102 is accomplished by successively comparing a master key word with each of the data key words until a match occurs. The data group associated with the matching data key word may then be retrieved from the storage device.

Error control for the retrieval process is provided by encoding each data key word in an m-bit-burst error correcting code prior to storing the word in the storage device 102. Similarly, each master key word used to identify a desired group of data is also encoded in the same $m$-bit-burst error correcting code.

Retrieval of data from the storage device 102 is initiated by a controller 106 applying a signal to the storage device 102 and also applying a "1" signal via a lead 108 to an AND gate 118. The storage device 102 then signals a clock 114 that it is about to commence applying a data key word to an EXCLUSIVE-OR gate 110. The clock 114, in turn, will apply synchronizing signals to the other units of the apparatus to enable the apparatus to operate in a synchronous mode.

The controller 106, in response to a clock signal from the clock 114, and the storage device 102 simultaneously apply corresponding bits of a master key word and a data key word respectively to the EXCLUSIVE-OR gate 110. It should be noted that the encoding unit for encoding the master key words could alternatively be located externally to the controller 106, in which case, the controller would apply an unencoded master key word to the encoding unit which would encode the word and apply it to the EXCLUSIVE-OR gate 110. With this arrangement, the encoding unit could also be utilized for encoding the data key words prior to their storage in the storage device 102.

The EXCLUSIVE-OR gate 110 compares each pair of corresponding bits of a data key word and a master key word and applies the result of such comparison to AND gate 118. Specifically, the EXCLUSIVE-OR gate 110 applies a "1" signal to AND gate 118 if a respective pair of bits do not match and applies a "0" signal if the respective pair of bits do match. Upon the occurrence of the first mismatch between a pair of bits, a "1" signal is applied via AND gate 118 (which was enabled by the "1" signal from the controller 106) to a flip-flop 122 thereby setting the flip-flop. The flip-flop, in turn, enables a counter 126 to commence counting. The counter 126 thereafter increments its count by one in response to each clock signal received from the clock 114 and coincident with the application of each pair of bits to the EXCLUSIVE-OR gate 110, until the counter reaches a count of m-1. Recall that $m$ is the burst length correcting capability of the code in which the data key words and master key words are encoded.

When the counter 126 reaches a count of $m-1$, an AND gate 130 is enabled causing the application of a "1" signal to the flip-flop 122 thereby resetting the flip-flop. The flip-flop, in turn, removes the enable signal from the counter 126. With the enable signal removed, the counter 126 remains at a count of $m-1$ and the AND gate 130 then continuously applies a "1" signal to an AND gate 134. Any succeeding pair of bits which mismatch causes the AND gate 118 to apply a "1" signal to the AND gate 134 which, together with the "1" signal from the AND gate 130, enables the AND gate 134 to apply a "1" signal to a flip-flop 138 thereby setting the flip-flop. The setting of this flip-flop indicates that the data key word and master key word being compared differed in bit positions over a span of more than *m* consecutive bits and therefore that the data key word is not the one being sought.

Setting the flip-flop 138 causes a "0" signal to be applied to an AND gate 140 indicating that the data associated with the mismatching data key word is not the data desired. Application of this "0" signal to the AND gate 140 inhibits the transfer of the data to a utilization circuit 142 from the storage device 102.

After each pair of data key and master key words has been compared, the controller 106 removes the "1" signal from, i.e., applies a "0" signal to, the AND gate 118. This "0" signal is also applied to an inverter 139 which, in turn, applies a "1" signal to the AND gate 140. Hence with the flip-flop 138 reset and the inverter 139 supplying a "1" signal, the AND gate 140 allows data to be passed to the utilization circuit 142 from the storage device 102. After the data group associated with the data key word most recently compared has been read from the storage device 102, the controller 106 initializes the various units of the FIG. 2 apparatus via a lead 144, i.e., resets the flip-flops and clears the counter. Just prior to application of the next data key word to the EXCLUSIVE-OR gate 110, the controller 106 again applies a "1" signal to the AND gate 118 via the lead 108 and the process described above is repeated.

If no mismatches between a data key word and a master key word occur or if the number of mismatches does not cover a span greater than *m*, then the data key word and the master key word being compared are assumed to be the same and the data key word is assumed to be the word sought. When this occurs, either the counter never commences to count (no mismatches) or the counter never reaches a count of $m-1$ (the first mismatch occurs within $m-1$ bits of the end of the words compared) or the counter reaches a count of $m-1$ with no further mismatches occurring (all mismatches are within a span of *m* bits). Under any of these circumstances, the flip-flop 138 is not set so that the AND gate 140 receives a "1" signal, which indicates that the data group associated with the matching data key word is the desired data. Following the comparison of the words, this data is applied by the storage device to the utilization circuit 142 via the AND gate 140.

In the above-described manner, a simple and yet efficient error control arrangement is provided for associative information retrieval such that the occurrence of a correctable number of errors (that number being determined by the code used) in a data key word does not corrupt the associative retrieval process. This result is achieved without the necessity of performing any error correction processing on erroneous data key words.

Figure 2:
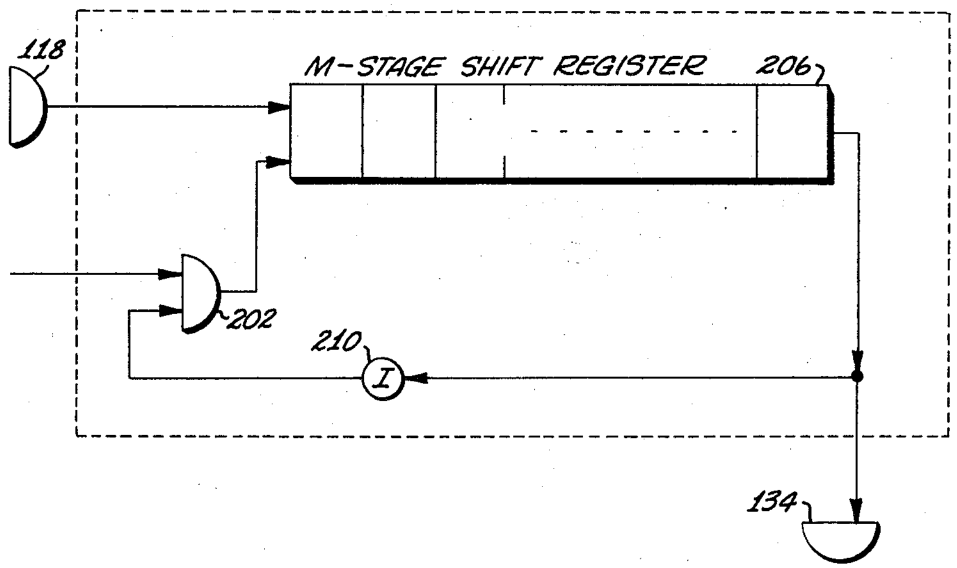
FIG. 2 shows an alternative embodiment of the circuitry shown in block 146 of FIG. 1.

FIG. 2 shows alternative circuitry which could be utilized in place of the circuitry shown within block 146 of FIG. 1. This FIG. 2 circuitry includes an AND gate 202, and *m*-stage shift register 206 and an inverter 210. Initially, the shift register 206 contains all "0" signals so that the output of shift register, i.e., the output of the rightmost stage, is a "0" signal. This "0" signal is inverted to a "1" signal by the inverter 210 and applied to the AND gate 202 thereby allowing the transfer of clock pulses from the clock 114 to the shift register 206. Each such clock pulse causes the shift register 206 to shift its contents one bit position to the right. Upon the occurrence of a mismatch at the EXCLUSIVE-OR gate 110 of FIG. 1, a "1" signal is applied via the AND gate 118 to the shift register 206. The contents of the shift register 206 are then successively shifted one bit position to the right with each bit comparison performed by the EXCLUSIVE-OR gate 110. After $m-1$ of such shifts, the initial "1" signal stored in the shift register 206 is located in the rightmost bit position of the shift register. This "1" signal is inverted by the inverter 210 to a "0" signal thereby disabling the AND gate 202, thereby inhibiting the application of clock pulses to the shift register 206 and thus preventing further shifting of the shift register 206. This "1" signal is then continuously applied to the AND gate 134 of FIG. 1 during the remainder of the comparison of the data key word and master key word.

As with the FIG. 1 apparatus, the occurrence of another mismatch results in the AND gate 134 of FIG. 1 applying a signal to the flip-flop 138 thereby setting the flip-flop and thus removing the flip-flop's "1" signal from AND gate 140. This, of course, indicates that the desired data has not been located. Following the comparison of a data key word and a master key word and the read out of the data group associated with the data key word, the controller 106 would initialize the shift register 206 (setting its contents to all "0" signals) thereby preparing it for the comparison of the next key data word and master word.

In the FIG. 1 circuitry, if no mismatches between a data key word and a master key word occur or if the number of mismatches does not cover a span greater than *m*, then the data group associated with the data key word is assumed to be the desired group and this group is transferred via AND gate 140 to the utilization circuit 142 of FIG. 1.

It is noted that detailed circuit configurations for the units 106 and 114 shown in FIG. 1 have not been given herein because their arrangements are considered to be clearly within the skill of the art.

Finally, it is understood the the above-described arrangements are only illustrative of the application of the principles of the present invention. Numerous other modifications and alternative arrangements may be devised by those skilled in the art without departing from the spirit and scope of the invention. For example, an error control arrangement utilizing a random error correcting code could be implemented in which the number of mismatches between a data key word and a master key word were counted. If the count exceeded the error correcting capability of the code, then a mismatch between the data key word and the master key word would be assumed otherwise a match would be assumed. Appropriate action with respect to the data associated with the data key word in question could then be taken. Furthermore, these operations and the operations performed by the FIGS. 1 and 2 apparatus could also be performed on an appropriately programmed general purpose computer.

I claim:

1. Apparatus for providing error control for associative information storage and retrieval comprising storage means for storing a plurality of data key words and a plurality of groups of data, each of said groups being associated with a data key word, each of said data key words being encoded in a burst error correcting code, means for comparing each data key word retrieved from said storage means with a master key word similarly encoded in said error correcting code, and means responsive to said comparing means for indicating, for each pair of words compared, whether the pattern of differing digits corresponds to an error pattern which is correctable by said error correcting code.

2. Apparatus as in claim 1 further comprising means responsive to an indication from said indicating means that a pattern of differing digits corresponds to an error pattern which is correctable by said error correcting code for enabling the retrieval from or replacement in said storage means of the group of data associated with the data key word of said each pair.

3. Apparatus as in claim 2 wherein said error correcting code is an $m$-bit-burst error correcting code and said indicating means includes means responsive to said comparing means for signalizing, for said each pair of words compared, whether $m$ exceeds or is equal to the span length $s$ of digit positions having differing digits.

4. Apparatus as in claim 3 wherein said enabling means includes means responsive to said signalizing means signalizing that $m$ exceeds or is equal to $s$ for enabling the retrieval from or replacement in said storage means of the group of data associated with the data key word of said each pair.

5. Apparatus as in claim 4 wherein said comparing means includes an EXCLUSIVE-OR gate for generating a logical "1" signal for each pair of differing bits applied thereto and for generating a logical "0" signal for each pair of like bits applied thereto.

6. Apparatus as in claim 5 wherein said signalizing means includes a counter responsive to the first logical "1" signal generated for a certain pair of words compared for counting each pair of bits of said certain pair thereafter applied to said EXCLUSIVE-OR gate up to a count of $m-1$, and means responsive to the logical "1" signal generated next following occurrence of said counter reaching a count of $m-1$ for indicating that $s$ exceeds $m$.

7. An error control method for associative information storage and retrieval comprising storing a plurality of data key words and a plurality of groups of data in a storage device, each of said groups being associated with a data key word, each of said data key words being encoded in a burst error correcting code retrieving a data key word from said storage device comparing said retrieved key data word with a master key word similarly encoded in said error correcting code, and generating a signal if, for the words compared, the pattern of differing digits corresponds to an error pattern which is correctable by said error correcting code.

8. A method as in claim 7 further comprising retrieving from or replacing in said storage device the group of data associated with the retrieved data key word in response to said signal.

9. Apparatus for facilitating a search of groups of data words in a sequential storage device on the basis of a key word, encoded in a burst error correcting code, in each group of data in which a mismatch between a master key word and the stored key word is determined by the time the key word is read out of the storage device comprising:

a counter for counting bits read from a storage device;

a controller for storing a master key word;

a comparator for detecting a mismatch between a bit in the key word from the storage device and a bit in the master key word from said controller;

counter control means for enabling said counter in response to said comparator detecting a bit mismatch;

span logic means responsive to said counter reaching a predetermined count for generating a signal indicative thereof;

mismatch logic means, responsive to said span logic means and said comparator, for generating a key word mismatch signal when a bit mismatch occurs after the predetermined count.

* * * * *